United States Patent [19]

Cisterni

[11] 4,112,145

[45] Sep. 5, 1978

[54] METHOD OF MANUFACTURING A LINING LAYER

[75] Inventor: Leandro Cisterni, Forli, Italy

[73] Assignee: S.U.B. Societa Utilizzazione Brevetti S.r.l., Forli, Italy

[21] Appl. No.: 609,720

[22] Filed: Sep. 2, 1975

[30] Foreign Application Priority Data

Sep. 9, 1974 [IT] Italy .............................. 12026 A/74
Sep. 9, 1974 [IT] Italy .............................. 12027 A/74
Sep. 23, 1974 [IT] Italy .............................. 12030 A/74

[51] Int. Cl.$^2$ ......................... B44C 1/20; B44C 1/24
[52] U.S. Cl. ..................................... 427/274; 427/278; 427/277; 427/355; 427/385 R; 264/175; 264/283; 264/293; 428/151; 428/537; 428/326; 428/921; 428/922
[58] Field of Search ............... 428/151, 326, 537, 160, 428/63, 535; 427/274, 277, 275, 278, 140; 264/284, 293; 425/371, 373; 260/42.51, 42.52, 17.4 R

[56] References Cited

U.S. PATENT DOCUMENTS

| | | | |
|---|---|---|---|
| 1,297,644 | 3/1919 | Boyer .............................. | 425/371 X |
| 2,057,882 | 10/1936 | Crowley ......................... | 260/17.4 R |
| 2,131,371 | 9/1938 | Esselen .......................... | 260/17.4 R |
| 2,204,324 | 6/1940 | Sohngen ........................ | 260/17.4 R |
| 2,806,008 | 9/1957 | McNulty ......................... | 428/403 |
| 2,849,752 | 9/1958 | Leary ............................ | 264/293 X |
| 2,888,359 | 5/1959 | Jorgensen et al. .............. | 427/140 |
| 3,192,294 | 6/1965 | Steed et al. .................... | 264/293 X |
| 3,470,286 | 9/1969 | Weber ........................... | 264/284 X |
| 3,536,574 | 10/1970 | Buckley ......................... | 428/151 |
| 3,542,641 | 11/1970 | Showalter et al. ............. | 428/151 X |
| 3,546,158 | 12/1970 | Champion et al. ............. | 260/17.4 R |

FOREIGN PATENT DOCUMENTS

1,575,752  6/1969  France.

OTHER PUBLICATIONS

Voronich et al., Chem. Abstracts, vol. 69; 88136g, 1968.

*Primary Examiner*—Ralph S. Kendall
*Attorney, Agent, or Firm*—Fleit & Jacobson

[57] ABSTRACT

A layered material for linings or coatings is made of a paste consisting principally of wood powder having a fineness similar to flour and vinylic glue, said paste being convertible into a foil by rolling cylinders, a press or other means.

The layered material may be engraved, printed, painted or may withstand any finishing work as wood.

To engrave or emboss the layered material an embossing belt or an embossing cylinder can be employed.

To manufacture the embossing cylinder a method is disclosed in which even the model itself which has to be imitated can be used as matrix for the cylinder.

17 Claims, 6 Drawing Figures

METHOD OF MANUFACTURING A LINING LAYER

This invention provides an inexpensive lining material capable of replacing such known materials as wood veneering, hides or skins, laminated plastics, and both natural and synthetic materials.

Particularly, these linings can be used for lining or coating furniture, frames, building walls, means of transport, footwear bottoms, etc.

Hitherto, wood veneering, as commonly referred to, was used in making panels for furniture; doors, etc., that is, a thin layer of wood (usually having a thickness of about 5/10mm) was glued on the supports or base frame. This system has a disadvantage of being expensive both for the intrinsic value of the material, particularly where valuable woods are used, and for the high percentage of off-cuts required in making a series of panels. It should be noted here that it is always desirable for a series of panels forming a piece of furniture to have the same or a symmetrical pattern of wood veneering (more or less flashed), which involves the elimination of all not perfectly similar or symmetrical parts.

In order to overcome this disadvantage, many substitutes have been adopted one of which comprises pre-compound wood veneering; that is, a compound material formed with layers of wood of different type and color, which layers are glued together and then transversely sheared, so as to provide a veneer which is always identical to itself. This eliminates most of the conventional off-cuts. This type of veneer suffers from the drawback of being expensive and difficult to manufacture, and it cannot exactly copy the natural wood veneers.

Other linings have been used, such as those comprising materials other than wood, for example paper or plastic sheets, made as far as possible similar to wood by means of embossing, printing or painting processes. Such processes have the disadvantage of producing a material which at sight or to touch is never identical to wood and therefore is not liable to be confused therewith.

It is an object of the present invention to provide a layered lining or coating, which can be infinitely reproduced uniformly to itself with eventually a predetermined pattern, for example quite similar to wood, which is also of economical manufacture and simple to use, since it can be treated during working of the piece of furniture or the like, as if it were wood.

It is another object of the invention to line or coat such surfaces as curved surfaces of extremely reduced radius, or even sharp-edged surfaces without impairing or losing any of its intrinsic features, by merely slightly heating it.

A lining or coating, according to the invention, can also cover surfaces having swells; thus, by a light heating, it can extend or locally expand, still without losing any of the external aesthetic features.

A lining or coating, according to the invention, can also be sealed or welded by the use of solvents.

According to an improvement of the invention, a system is also provided for engraving or embossing the lining or coating surface, so as to impart thereto the appearance of any type of wood. In particular, a surface can be embossed or engraved with walnut, palisander, ash, bay or chestnut oak or other type of pattern, or even with a fancy pattern.

The lining or coating has the additional advantage that it can be made self-extinguishing or flame-proof and anti-electrostatic; that is, dust cannot be attracted thereto.

The above mentioned objects are accomplished by providing a mixture mainly comprising wood powder and vinyl glue with optional addition of additives, to be specified hereafter, and forming this mixture by means of a series of pairs of rolling cylinders, or a press or any appropriate system, to a thickness of a few tenths of a millimeter (generally in the range of 2 to 50 tenths). The lining or coating can then be directly applied to a rigid support and dried, or can be naturally mechanically dried as a foil, whereupon it can be cut to sheets of a desired length, or wound up in rolls or coils. This basic process can be completed by such further processes as embossing, painting, printing, sanding or other type of trimming similar to that which is carried out on wood.

Particularly, instead of passing through rolling cylinders, a simple spreading of the mixture directly on a rigid support can be carried out.

For a better explanation, an embodiment of a lining or coating, according to the invention, will now be described, the basic components of the lining or coating being as follows:

(a) Wood powder. This element forms the substantial body of the novel material, whereas the other elements added thereto serve for transforming it into a workable pulp. The wood powder is readily available as residual material of wood working. In particular, beech wood powder having a degree of fineness similar to that of corn flour ranging, for example, from 150 to 250 ASTM, can be preferably used.

The type of wood can be chosen depending on the desired hardness for the lining or coating. For example, when using poplar wood powder, a hardness will be obtained which is lower than that of a lining or coating obtained by using beech wood powder under the same conditions.

(b) Vinyl glue. This element accomplished a dual function: that of binding the wood particles and, depending on the different percentages in the mixture, it provides a higher or lower plasticity and impermeability of the finished material. As used herein, the expression vinyl glue refers to, and is defined as, a polyvinyl acetate of low molecular weight and having a means polymerization degree of from between about 150 to 3000. This product is commercially available being sold e.g., by the Montedison Company under the trademark "Vinavil."

(c) Solvents. The solvents serve to form the adhesive or bonding agent and, therefore, are used according to the amount required by the particular type of vinyl glue used. By way of illustration, but without limitation, the solvent used could be toluene or acetone or any other diluent or solvent compatible with the vinyl glue being used, or a mixture of various diluents, or solvents; water not being excluded.

(d) Inert mineral charges. These charges or fillers are admitted to the mixture in pulverulent form to make the material more compact, as said mineral charges or fillers will penetrate between the wood particles, filling the empty spaces. Still by way of illustration without limitation, the following minerals are mentioned as particularly suitable minerals: sodium carbonate, kaolin, and magnesium silicate.

(e) Lubricating oil. Any type of mineral, vegetable, or animal oil can be used, since said element is only for preventing the mixture from adhering to the working machines.

Following hereafter is an example utilizing an optimum formulation which has already been carried out with good results:

| Acetone | 26.5% |
| --- | --- |
| Toluene | 13.2% |
| Oil | 4% |
| Vinyl glue | 13.2% |
| Wood powder | 26.5% |
| Inerts (Sodium carbonate) | 16.6% |
| | 100.0 |

Generally, the percentages for the various products above listed are maintained within these limits:

| Acetone | 20%–30% |
| --- | --- |
| Toluene | 10%–15% |
| Oil | 3%–5% |
| Vinyl glue | 10%–15% |
| Wood powder | 25%–30% |
| Inerts | 10%–20% |

As mentioned above, other additives, such as coloring, flame-proof or anti-electrostatic products may be added.

To manufacture the material according to the invention, it is essential to accurately mix the various components, as proportioned to the desired type of material, and then, preferably, forcibly insert the mixture under rolling cylinders, a press or the like, thereby turning the mixture into a uniform thin layer.

After providing said uniform layer, the solvent is naturally or mechanically evaporated, so that the material can be deemed to be ready for use. However, since a lining or coating material is being dealt with, this method, of course, could be completed with trimming operations so as to perfectly simulate a preselected sample.

Embossing is one of the primary treatments to which a layered sheet can be subjected; that is, an engraving process to take, for example, the form or pattern of wood grain.

It should be pointed that sheet engraving can be carried out at any time starting from the sheet forming step, but it is particularly advantageous if one cylinder of the last pair of rolling cylinders is an embossing cylinder; that is, capable of providing such engravings on the lining or coating as to perfectly stand for, for example, the grain of a particular type of wood, the pattern, of natural skin or hides, etc.

Hitherto, embossing cylinders were provided by means of photoengraving, etching or merely by machining. Photo-engraving engraving is inexpensive, but fails in producing a perfect copy for embossing layered material. Etching is an expensive and similarly unreliable process. Finally, machining can attain good levels as to perfection, but is an extremely expensive, time-consuming and difficult process.

Thus, the invention also provides a preferred method for manufacturing an embossing cylinder, thereby providing an economical cylinder producing a perfect and highly reliable embossing.

For the manufacture of an embossing cylinder, according to the present invention, it is preferred to use as a model the same material to be reproduced on the cylinder for engraving. However, the cylinder manufacture method is always the same, even if the model used is not the article to be imitated, but merely a fancy pattern or the like.

According to the invention, the cylinder manufacturing method substantially consists of wrapping the model to be copied around a cylindrical supporting means or capsule, and casting or applying all around the model a hardening material closely adhering to it, so that the inner capsule can be removed and resin poured or cast into the cleared peripheral space, which resin will perfectly copy the model shape. According to the invention, it is also contemplated that the cylinder may be made with metal walls. In this case, wax or the like will be poured in lieu of the resin, then plaster thereabout and finally metal in lieu of wax.

In order that this method may be more clearly understood, two exemplary embodiments of an embossing cylinder will now be described in connection with the accompanying drawings, given by way of illustration, but without limitation, in which:

FIG. 1 shows a frame A having secured thereon a cylindrical metal element B having two threaded axial hubs B1 and a ring B2 projecting over the bottom base. These parts will respectively form the embossing cylinder core and associated axes about which said cylinder will rotate.

Cylinder B is then covered by a support or cylindrical capsule C secured to B and having the same diameter as said ring B2 and equal to the diameter of the finished embossing cylinder.

Figure 1:
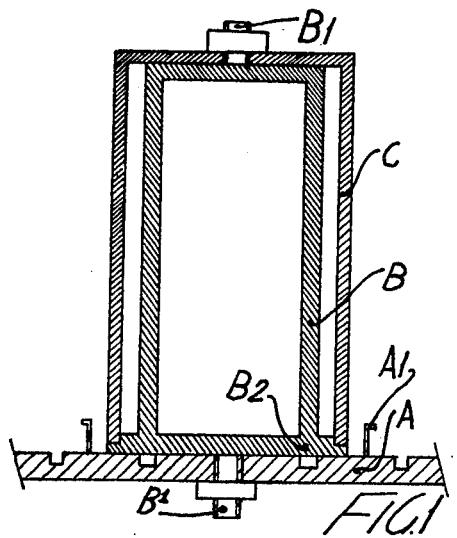
FIGS. 1–4 are longitudinal sectional views showing a resin embossing cylinder at different successive manufacturing stages.
Figure 2:
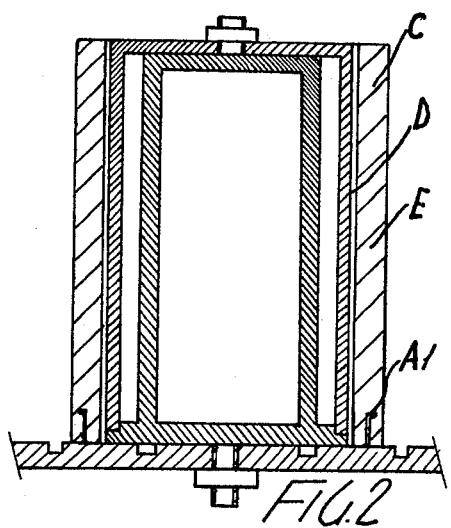

At the next subsequent step (FIG. 2), the cylindrical surface of capsule C is wrapped by model D to be imitated (wood veneers, skin or the like), considering that the impression will be provided by the surface facing capsule C. On completion of the capsule lining or coating, an outer shell E will be formed, this shell being capable of gripping to model D and retaining it at the exact position given thereto by capsule C. By way of indication, it could be pointed out that shell E can be made by a plaster covering or other equivalent operation.

Figure 3:
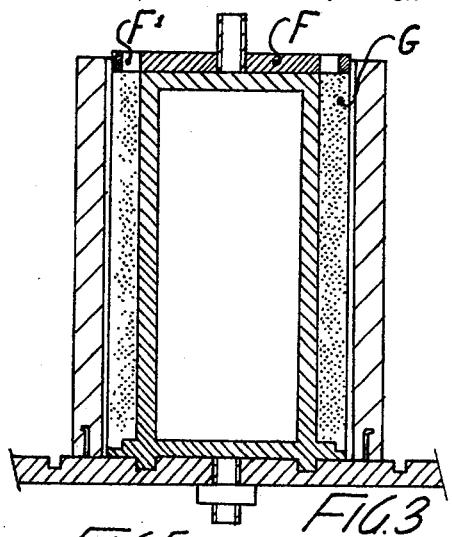

After the required consistency of shell E has been attained, capsule C is removed from the top, suitably taking care of not damaging model D. Where particularly delicate models are involved, use could be made of individually removable capsules which can be demounted in a plurality of sections. As the capsule is removed, shell E retains its initial position owing to a series of clips A1, which are secured to frame A and incorporated in said shell during formation of the latter. After removing capsule C, a flange F of a diameter equal to that of the lower ring B2 and having a series of holes F1 at the gap between the surfaces of cylinder B and model D is secured (FIG. 3) at the top of element B. Then, epoxy resin G or other material suitable to reproduce the shape of model D is introduced through holes F1.

Figure 4:
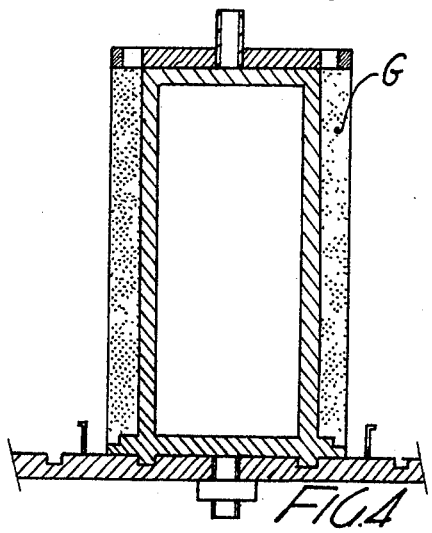

When material G has been solidified, the cylinder is cleared of shell E and model D, thus being finished as shown in FIG. 4.

Figure 5:
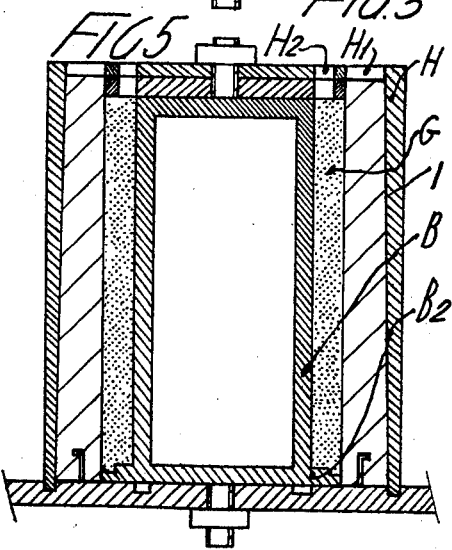
FIGS. 5 and 6 are longitudinal sectional views showing a metal embossing cylinder at two successive manufacturing stages.
Figure 6:
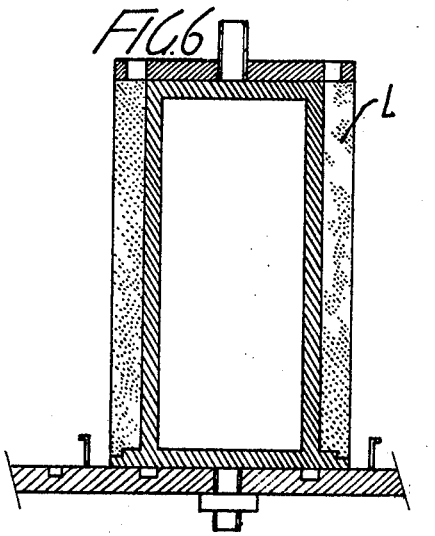

When having to provide embossing cylinders of metal or other high melting temperature material, and having to reproduce such type of materials as wood or skins not enduring high temperatures, initially the process followed is the same as for the above described steps, with the only difference being that instead of pouring or casting resin G through holes F1, in this case wax, paraffin or other equivalent material will be poured or cast. The cylinder covered with wax or the like, as shown at the step of FIG. 4, is preferably covered by a bell H concentrically arranged with respect to the already formed wax cylinder (FIG. 5) and having on the single upper base two concentric arrays of holes, the outer array H1 corresponding to the gap between bell H and the cylinder, and the inner array H2 corresponding to the layer G here being formed with wax or the like. Through holes H1 the free gap is filled with plaster I or other refractory material suitable to form a second die about layer G. Upon solidification of material I, metal or other molten material L is introduced through holes H2 after removing the wax or the like forming said material G, so that said metal will solidify and attach to element B, taking the shape of the original model D and thus forming the metal embossing cylinder, which has been shown in FIG. 6.

It is apparent that, the basic features of the invention remaining unaltered, other modified approaches can be adopted, such as the use of a spool element B having two flanges, of which the lower flange is fixed and the upper flange demountable, both of such flanges being provided with suitable holes. Thus, the support or capsule on which model D is mounted can be made in many ways, provided that it can be removed after fastening of model D, so that at its place a material G can be poured or cast, this material copying the internal surface of model D. The constructive simplicity of the inventive system makes its use convenient also for providing cylinders intended to reproduce any pattern and form in addition to the above mentioned woods and skins.

Should the embossing operation be carried out when the layered material is already dried, it would be necessary to carry out such an operation under warm conditions in order to avoid any losses of engravings. In other words, in case of cold embossing some engravings would resume elastically their starting form.

When using an embossing cylinder of the above described design, it should be taken into account that the pattern to be reproduced, be it continuous or discontinuous, is to be dimensioned in accordance with the circumference of the cylinder of a particular machine; that is, the larger the pattern the larger must be the diameter of the embossing cylinder. In case the cylinder diameter should become too large, continuous engraved belts having the same length as that of the continuous or discontinuous pattern to be reproduced may be used.

The provision of belts may vary according to the intended use, printing or engraving, and also according to the higher or lower consistency of the surface on which the reproduction of a pattern by engraving is to be carried out. By way of illustration, but without limitation, some of the many possible approaches will be mentioned:

(a) belt made of a single layer formed of plastic material, metal or other suitable material, is applied in a molten state onto the mold carrying the pattern matrix;

(b) belt comprising one or more supporting layers (cloth, rubber, reinforced rubber, plastic material, metal or other suitable material), of which the external one is made of material in a plastic state (plastic resins, curable silicone rubbers, plastic metal or other suitable material) which is pressed against a matrix taking the impression thereof;

(c) belt comprising a backing layer and an engraved layer which is fixed to the former after engraving.

The advantages resulting from using such a belt can be readily summarized as follows:

(a) possibility of engraving the belt both by a plate matrix and a roller matrix, since the two edges can be joined either before or after engraving;

(b) possibility of using, without any modifications to the press and cylinders, different belts, the length of which is dimensioned according to the continuous or discontinuous pattern to be reproduced.

To complete the foregoing description, it should be added that the difference in the materials that can be used for forming the belts, may lead to more or less flexible products, but without jeopardizing at all the intended use thereof.

Additionally, to avoid a possible slipping of the web on the press cylinder, tooth and pit couplings or other known expedients could be provided for assuring a synchronized movement between belt and layered material to be engraved.

Finally, the layered material working process, according to the invention, could be completed by a material coloring step, which could be limited to treating the involved surface, or the entire thickness, and in this case the color or dye would be added to the other components during the mixing step.

The sheet material can be installed either in a cold or hot condition when, due to the particular configuration of the support, a higher plasticity of the covering would be required.

Thus, as previously cited, a lining or coating, according to the invention, would be slightly flexible at cold condition, so that it can be wrapped in rolls and can encircle curved articles, but its plasticity will substantially increase when heated to about 70° C. In this case, the linings or coatings can cover any surface, such as those having unexpected swells, about which the material will extend, or sharp edges such as, for example, a knife blade.

What I claim is:

1. A method for producing a dried, layered material for a lining or coating comprising forming a paste mixture consisting essentially of from between about 20% to 30%, by weight, acetone; from between about 10% to 15% by weight, toluene, from between about 3% to 5% by weight, lubricating oil; from between about 10% to 15% by weight, vinyl glue; from between about 25% to 30% by weight, powder wood; and from between about 10% to 20%, by weight of an inert filler; converting said mixture to a layer having a thickness of from between about 2/10 of a millimeter to a few millimeters; and drying the said layer by evaporating said acetone and toluene.

2. The method of claim 1 wherein said paste mixture is converted to said layer by pressing.

3. The method of claim 1 wherein said paste mixture is converted to said layer by means of rolling cylinders.

4. The method of claim 1 wherein the formed layer is directly applied to a rigid support and dried.

5. The method of claim 1 wherein the formed layer is mechanically dried into the form of a foil.

6. The method of claim 1 wherein said wood powder has a degree of fineness ranging from between about 150 to 250 mesh.

7. The method of claim 1 wherein said inert filler is selected from the group consisting of sodium carbonate, kaolin, and magnesium silicate.

8. The method of claim 1 wherein said paste mixture consists essentially of about 26.5% of acetone, about 13.2% of toluene, about 4% of lubricating oil, about 13.2% of vinyl glue, about 26.5% of wood powder, and about 16.6% of sodium carbonate.

9. The method of claim 1 wherein said paste, in addition to said wood powder, vinyl glue, solvent, filler, and lubricating oil, also includes an additive selected from the group consisting of a dye, a flameproofing agent, an anti-electrostratic agent, and mixtures thereof.

10. A method of embossing or engraving the layered material of claim 1 comprising contacting said layered material with a rolling cylinder provided with a surface carrying an impression corresponding to the desired embossing or engraving.

11. The method of claim 10 wherein the layered material is heated prior to said embossing or engraving.

12. The method of claim 10 wherein the embossed, layered material is subjected to an operation normally carried out on wood and selected from the group consisting of printing, polishing, sanding, and any combination thereof.

13. A method comprising subjecting the embossed, layered material of claim 10 to a printing, polishing, or sanding operation, or any combination thereof, as normally carried out on wood.

14. The method of claim 1 wherein the dried, layered material is subjected to an operation normally carried out on wood and selected from the group consisting of printing, polishing, sanding, and any combination thereof.

15. A method comprising subjecting the dried, layered material of claim 1 to a printing, polishing, or sanding operation, or any combination thereof, as normally carried out on wood.

16. The method of claim 1 wherein the formed layer is air-dried.

17. The method of claim 1 wherein the formed layer is dried by mechanical means.

* * * * *